(12) United States Patent
Zhang et al.

(10) Patent No.: US 8,112,373 B2
(45) Date of Patent: Feb. 7, 2012

(54) NERVE EQUIVALENT CIRCUIT, SYNAPSE EQUIVALENT CIRCUIT AND NERVE CELL BODY EQUIVALENT CIRCUIT

(75) Inventors: Xiaolin Zhang, Tokyo (JP); Yoshinori Maeda, Yokohama (JP)

(73) Assignee: Tokyo Institute of Technology, Tokyo (JP)

( * ) Notice: Subject to any disclaimer, the term of this patent is extended or adjusted under 35 U.S.C. 154(b) by 688 days.

(21) Appl. No.: 12/281,812
(22) PCT Filed: Mar. 5, 2007
(86) PCT No.: PCT/JP2007/000168
§ 371 (c)(1),
(2), (4) Date: Jan. 21, 2009
(87) PCT Pub. No.: WO2007/102275
PCT Pub. Date: Sep. 13, 2007

(65) Prior Publication Data
US 2009/0307165 A1 Dec. 10, 2009

(30) Foreign Application Priority Data
Mar. 6, 2006 (JP) ................................. 2006-060338

(51) Int. Cl.
*G06E 1/00* (2006.01)
*G06G 7/58* (2006.01)
(52) U.S. Cl. .......................................... 706/26; 703/11
(58) Field of Classification Search .................... 706/26; 703/11
See application file for complete search history.

(56) References Cited

OTHER PUBLICATIONS

Yoshifumi Nakado et al., "Sogo Ketsugo Saseta Kofun Yokusei Neuro Tai Kairo no doki Gensho", IEICE Technical Report, The Institute of Electronics, Information and Communication Engineers, Mar. 10, 2004, vol. 103, No. 732, pp. 23 to 28.

Kenji Dotani, "Neuron no Model", Mathematical Sciences, Saiensusha Co., Ltd., Jul. 26, 2005, vol. 43, No. 8, pp. 63 to 72.

Kazutaka Shimetani et al., "Jikusaku no Hardware Model", The Transactions of the Institute of Electronics, Informationa nd Communication Engineers, The Institute of Electronics, Information and Communication Engineers, Dec. 25, 1999, vol. J82-C-II, No. 12, pp. 655 to 661.

Cho Gyorin et al., "Shinkei Saibo no Denkiteki Toka Kairo to Seishimaku Den'i", The Transactions of the Institute of Electrical Engineers of Japan C, May 1, 1999, vol. 119-C, No. 5, pp. 539 to 544.

Zhang X. et al., kA new equivalent circuit different from the Hodgkin-Huxley model, and a equation for the resting membrane potential of a cell, Artif Life Robotics, 2002, vol. 6, No. 3, pp. 140-148.

D. E. Rumelhart, G. E. Hinton & R. J. Williams, "Learning Internal Representations by Back-Propagation Errors", Nature, 323, 533-536, Oct. 1986.

*Primary Examiner* — Alan Chen
*Assistant Examiner* — Ababacar Seck
(74) *Attorney, Agent, or Firm* — McGlew and Tuttle, P.C.

(57) ABSTRACT

A nerve equivalent circuit, a synapse equivalent circuit and a cell body equivalent circuit are provided whereby electrical characteristics in accordance with the physiological functions and physical structures of nerve cells are reproduced. A nerve equivalent circuit simulating the electrical characteristics of nerve cells wherein an input signal $f_{in}(t)$ and an output signal $f_{out}(t)$ satisfies the relationship represented by [Numerical formula 11], wherein $k_P$, $k_I$ and $T_I$ are each a definite constant number, N represents the total number of synapses, M represents the total number of the kinds of the first transmitters carried by the synapses, and L represents the total number of the kinds of the second transmitters carried by the synapses.

17 Claims, 10 Drawing Sheets

Na Ion Channel Part

Fig. 11

Na ion channel is turned on when predetermined threshold value is exceeded.

NERVE EQUIVALENT CIRCUIT, SYNAPSE EQUIVALENT CIRCUIT AND NERVE CELL BODY EQUIVALENT CIRCUIT

TECHNICAL FIELD

This invention relates to a nerve equivalent circuit, a synapse equivalent circuit and a nerve cell body equivalent circuit. More particularly, the present invention relates to a nerve equivalent circuit, a synapse equivalent circuit and a nerve cell body equivalent circuit that simulate respectively the electric characteristics of the nerve circuits, those of the synapses and those of the nerve cell bodies.

BACKGROUND ART

Different from analog signals and digital signals, the signal transmission among nerve cells is known to be realized by electric signals that resemble an impulse train corresponding to pulse frequency modulation. The Hodgkin Huxley equations for describing the ignition mechanism of nerve cells are also well known. According to the Hodgkin Huxley equation, the nerve cell membrane can be expressed by an electric equivalent circuit of a certain type and the nerve activity can be expressed by expressing the conductance relative to ions by means of a function of voltage and time.

Additionally, an artificial nerve circuit shown in Patent Document 1 is known as an equivalent circuit simulating the ignition phenomenon.

Massive research efforts have been and being paid for the neural network in the field of artificial intelligence and automatic control. The sigmoid function (f(x)=1/(1+exp(-x)) or the like is employed for each unit of the network (see Non-Patent Document 1).

Patent Document 1: Japanese Patent Application Kokai Publication No. Hei 07-168901

Non-Patent Document 1: D. E. Rumelhart, G. E. Hinton & R. J. Williams, "Learning Internal Representations by Back-Propagation Errors", Nature, 323, 533-536, Oct. (1986)

DISCLOSURE OF THE INVENTION

Problem To Be Solved By The Invention

However, nothing that can faithfully reproduce the ignition phenomenon of the nerve cell is known. The equivalent circuit using the Hodgkin Huxley equations does not take the mechanism of synapses, which are input units of cells, into consideration. It does not involve any study for realizing the information processing function of nerve cells. Additionally, the ignition principle of the technique of Patent Document 1 is not an equivalent circuit of nerve cells in the true sense of the words and it is difficult to realize the signal processing function of nerve cells by faithfully simulating the signal transmission among nerve cells on the basis thereof. More specifically, with the technique of Patent Document 1, while a pulse is output from the axon circuit when the output potential of the nerve cell body circuit exceeds a predetermined threshold value, the circuit cannot be provided with an arithmetic function like that of nerve cells unlike the physiological characteristics of actual nerve cells because the electric potential of the nerve cell body circuit never falls. Further, the axon circuit according to Patent Document 1 is merely a channel for correctly transmitting information, not provided with an arithmetic function.

Since the sigmoid function is mainly employed in each unit of neural networks that have been proposed to date, they are not dynamic systems. Therefore, it is difficult for them to control the object to be controlled that is a dynamic system. Additionally, the neural networks that have been proposed to date are algorithms obtained on the basis of mathematical ideas and do not involve the use of the characteristics of actual nerves.

In view of the above-identified circumstances, it is therefore an object of the present invention is to mathematize input/output relations of a nerve circuit, a synapse and a nerve cell body and provide a nerve equivalent circuit, a synapse equivalent circuit and a nerve cell body equivalent circuit where the electric characteristics that are in accordance with the physiological characteristics and the physical structures of nerve cells are faithfully reproduced.

Means for Solving the Problem

According to the present invention, the above object is achieved by providing a synapse equivalent circuit for simulating electric characteristics of synapses, the circuit comprising an input terminal and an output terminal, an input signal $f_{in}(t)$ input to the input terminal and an output signal $I_{psp}(t)$ output from the output terminal having the relationship expressed by the formula shown below:

$$I_{psp}(t) = \sum_{m=1}^{M} {}^m k_P f_{in}(t) + \sum_{l=1}^{L} {}^l k_I \int_0^t e^{-\frac{1}{{}^l T_I}(t-\tau)} f_{in}(\tau) d\tau$$

wherein $k_P$ is a constant within a range defined by $-\infty < k_P < \infty$, $k_I$ is a constant within the range defined by $-\infty < k_I < \infty$, $T_I$ is a constant within the range defined by $0 < T_I \leq \infty$, L is the total number of the kinds of first transmitter substances that synapses have, I=1, 2, ..., L and represents the ordinal number of a first transmitter substance of synapses, M is the total number of the kinds of second transmitter substances that synapses have, m=1, 2, ..., M and represents the ordinal number of a second transmitter substance of synapses, e is the Napier's constant, t is time, and $\tau$ is the time from t=0 to the current time.

Preferably, the input terminal may be connected to a voltage control resistance section through an electric resistance and the output terminal is connected to the voltage control resistance section through a power source in order to realize the first term of the right side of the above formula.

Further, an electric potential between the electric resistance and the voltage control resistance section may be connected to a reference potential through a parallel circuit where a second electric resistance and a capacitor are connected in parallel in order to realize the second term of the right side of the above formula.

Moreover, the parallel circuit may further have a coil connected in parallel.

Preferably, the input terminal may be connected to an environment sensory section.

Further, the input signal $f_{in}(t)$ may be input to the input terminal through a signal rectification device.

In another aspect of the present invention, there is provided a nerve cell body equivalent circuit for simulating electric characteristics of nerve cell bodies, the circuit comprising an input terminal and an output terminal, an input signal $I_{psp}(t)$ input to the input terminal and a membrane potential $V_m(t)$ output from the output terminal having the relationship expressed by the formula shown below:

$$V_m(t) = \begin{cases} -E_0 + (E_0 + V_m(t_0))e^{-\frac{1}{T_m}(t-t_0)} + k_m \int_{t_0}^t e^{-\frac{1}{T_m}(t-\eta)} \sum_{n=1}^{N} {}^n I_{psp}(\eta) d\eta & V_m(t) < \sigma \\ \delta(\tau - t) & V_m(t) \geq \sigma \end{cases}$$

wherein $E_0$ is a resting membrane potential, $k_m$ is a constant within the range defined by $0<k_m<\infty$, $T_m$ is a constant within the range defined by $0\leq T_m\leq\infty$, N is the total number of synapses, n=1, 2, ..., N and represents the ordinal number of a synapse connected to the nerve cell, e is the Napier's constant, t is time, $t_0$ is the time when the preceding pulse ended, τ is the time from t=0 to the current time, η is the time from t=$t_0$ to the current time, σ is the threshold value of an active potential of nerve cell membrane, and δ(t) is an impulse function.

Preferably, a nerve cell body equivalent circuit may be constituted by connecting, in parallel between the output terminal and a reference potential terminal, a circuit where a capacitor corresponding to the cell membrane capacitance, a circuit where a power source corresponding to the resting membrane potential and an electric resistance corresponding to a permeability of cell membrane are connected in series, and a sodium ion channel equivalent circuit which connects in series a power source corresponding to an equivalent potential of a chemical potential of a sodium ion, a relay element corresponding to a sodium ion channel, and an electric resistance corresponding to a permeability of a sodium ion channel.

Further, a nerve cell body equivalent circuit may be constituted by further connecting, in parallel between the output terminal and the reference potential terminal, a potassium ion channel equivalent circuit which connects in series a power source corresponding to the equivalent potential of a chemical potential of a potassium ion, a relay element corresponding to a potassium ion channel, and an electric resistance corresponding to a permeability of the potassium ion channel.

Moreover, a nerve cell body equivalent circuit may be constituted by further connecting, in parallel between the output terminal and the reference potential terminal, an ion channel equivalent circuit which connects in series a power source corresponding to the equivalent potential of the chemical potential of a predetermined ion other than a sodium ion and a potassium ion, a relay element corresponding to the ion channel of the predetermined ion, and an electric resistance corresponding to a permeability of the ion channel of the predetermined ion.

Preferably, the output terminal may be connected to an object to be controlled by the nerve cell body equivalent circuit.

In still another aspect of the present invention, there is provided a nerve equivalent circuit for simulating the electric characteristics of a nerve cell, in which an input signal $f_{in}(t)$ and an output signal $f_{out}(t)$ thereof have a relationship expressed by the formula shown below:

$$f_{out}(t) = \sum_{n=1}^{N}\left(\sum_{m=1}^{M}{}^{nm}k_P{}^n f_{in}(t) + \sum_{l=1}^{L}{}^{nl}k_I\int_0^t e^{\frac{1}{{}^{nl}T_I}(t-\tau)}{}^n f_{in}(\tau)d\tau\right)$$

wherein $k_P$ is a constant within a range defined by $-\infty<k_P<\infty$, $k_I$ is a constant within the range defined by $-\infty<k_I<\infty$, $T_I$ is a constant within the range defined by $0<T_I\leq\infty$, N is the total number of synapses, n=1, 2, ..., N and represents the ordinal number of a synapse connected to the nerve cell, M is the total number of the kinds of first transmitter substances that synapses have, m=1, 2, ..., M and represents the ordinal number of an n-th first transmitter substance of synapses, L is the total number of the kinds of second transmitter substances that synapses have, l=1, 2, ..., L and represents the ordinal number of an n-th second transmitter substance of synapses, e is the Napier's constant, t is time, and τ is the time from t=0 to the current time.

Preferably, the output terminal of a synapse equivalent circuit may be connected to the input terminal of a nerve cell body equivalent circuit.

Further, the input terminal of a synapse equivalent circuit may be connected to the output terminal of a nerve cell body equivalent circuit.

In a further aspect of the present invention, there are provided a program for causing a computer to function as a synapse equivalent circuit, a program for causing a computer to function as a nerve cell body equivalent circuit, and a program for causing a computer to function as a nerve equivalent circuit.

ADVANTAGES OF THE INVENTION

A nerve equivalent circuit, a synapse equivalent circuit and a nerve cell body equivalent circuit according to the present invention have an advantage that they can faithfully reproduce the electric characteristics in accordance with the physiological functions and the physical structures of nerve cells. Additionally, a nerve equivalent circuit, a synapse equivalent circuit and a nerve cell body equivalent circuit according to the present invention can process information and transmit signals on a stable basis. Still additionally, since the input/output relationships of a nerve equivalent circuit, a synapse equivalent circuit and a nerve cell body equivalent circuit are anathematized, the functions of a nerve equivalent circuit, a synapse equivalent circuit and a nerve cell body equivalent circuit according to the present invention can be realized not only by means of electric circuits but also on a computer. Therefore, new neural networks and artificial intelligence algorithms can be realized. Furthermore, a large scale parallel arithmetic operation typically involving tens of thousands of additions, subtractions, integrations and proportionality computations can be conducted by means of a single nerve equivalent circuit by simultaneously carrying out those computations.

BEST MODE FOR CARRYING OUT THE INVENTION

A nerve cell body equivalent circuit according to the present invention is designed to improve the equivalent circuit formed by using the Hodgkin Huxley equations and realize the function of an ion channel by means of an electric element and other elements. The present invention also proposes a synapse equivalent circuit that can realize an excitatory synapse and an inhibitory synapse that are most important for inputting and processing signals and also provides a nerve equivalent circuit realizing an equivalent circuit of an entire nerve cell. Thus, according to the present invention, an equivalent circuit of a synapse that is a structure at a site of junction relating to nerve activities formed among nerve cells can be realized and signals can be input to and output from there. Therefore, a nerve equivalent circuit that processes signals on a principle same as a nerve cell can be realized.

Since the input terminal of a synapse equivalent circuit according to the present invention can be connected to an environment sensory sensor such as a pressure sensor or a temperature sensor, a nerve equivalent circuit where the signal from the environment sensory sensor is input to the synapse equivalent circuit just like the signal from a perception cell is transmitted to a nerve cell and the output thereof is transmitted to a nerve cell body equivalent circuit can be realized.

Additionally, since the output terminal of a nerve cell body equivalent circuit can be connected to a section to be controlled such as a motor or an actuator to be controlled by a nerve cell body equivalent circuit or a driver circuit for controlling such a motor or an actuator, a nerve equivalent circuit where the signal from a nerve cell body equivalent circuit is transmitted to the section to be controlled just like the signal from a nerve cell is transmitted to a muscle cell can be realized.

Now, a nerve cell body equivalent circuit according to the present invention will be described in detail below. The relationship as defined below is established when the membrane potential of a nerve cell body from the time when the preceding pulse ended to the time when the next pulse starts is considered:

$$0 = \sum_{n=1}^{N} {}^n I_{psp}(t) + C_m \frac{dV_m(t)}{dt} + (V_m(t) + E_0)g_0$$

wherein $I_{psp}(t)$ is the electric current flowing from the post-synapse to the nerve cell body, $V_m(t)$ is the membrane potential, $-E_0$ is the resting membrane potential, N is the total number of synapses, n=1, 2, ..., N and represents the ordinal number of a synapse connected to the nerve cell, t is time, $C_m$ is the electric capacitance of the cell membrane, and $g_o$ is the equivalent conductance of the cell membrane relative to the entire permeable ions.

From the above formula, the relationship between the membrane potential $V_m(t)$ and the input signal $I_{psp}(t)$ before an ignition is expressed by the formula shown below:

$$V_m(t) = -E_0 + (E_0 + V_m(0))e^{-\frac{g_0}{C_m}(t-t_0)} + \frac{1}{C_m}\int_{t_0}^{t} e^{-\frac{g_0}{C_m}(t-\tau)} \sum_{n=1}^{N} {}^n I_{psp}(\tau)d\tau \quad \text{[Formula 1]}$$

wherein $V_m(O)$ is the membrane potential after the end of an action potential, e is the Napier's constant, $t_0$ is the time when the preceding pulse ended, $\tau$ is the time from $t=t_0$ to the current time, and $C_m$ is the electric capacitance of the cell membrane.

By modifying the above formula so as to express the electric characteristics of various electric circuits and at the same time the action potentials thereof, it is found that the input current $I_{psp}(t)$ input to the input terminal and the membrane potential $V_m(t)$ output from the output terminal of the nerve cell body equivalent circuit are sufficient to have the relationship expressed by the formula shown below:

$$V_m(t) = \begin{cases} -E_0 + (E_0 + V_m(t_0))e^{-\frac{1}{T_m}(t-t_0)} + k_m \int_{t_0}^{t} e^{-\frac{1}{T_m}(t-\eta)} \sum_{n=1}^{N} {}^n I_{psp}(\eta)d\eta & V_m(t) < \sigma \\ \delta(\tau - t) & V_m(t) \geq \sigma \end{cases} \quad \text{[Formula 2]}$$

wherein $k_m$ is a constant within the range defined by $0 < k_m < \infty$, $T_m$ is a constant within the range defined by $0 \leq T_m \leq \infty$, $\eta$ is the time from $t=t_0$ to the current time, $\sigma$ is the threshold value of the active potential of nerve cell membrane, and $\delta(t)$ is an impulse function.

Any circuit having an input/output relationship that satisfies the above formula can be said to be an equivalent circuit that simulates a nerve cell body. Note that an impulse function $\delta(t)$ can be approximately realized typically by means of a relay circuit.

Figure 1:
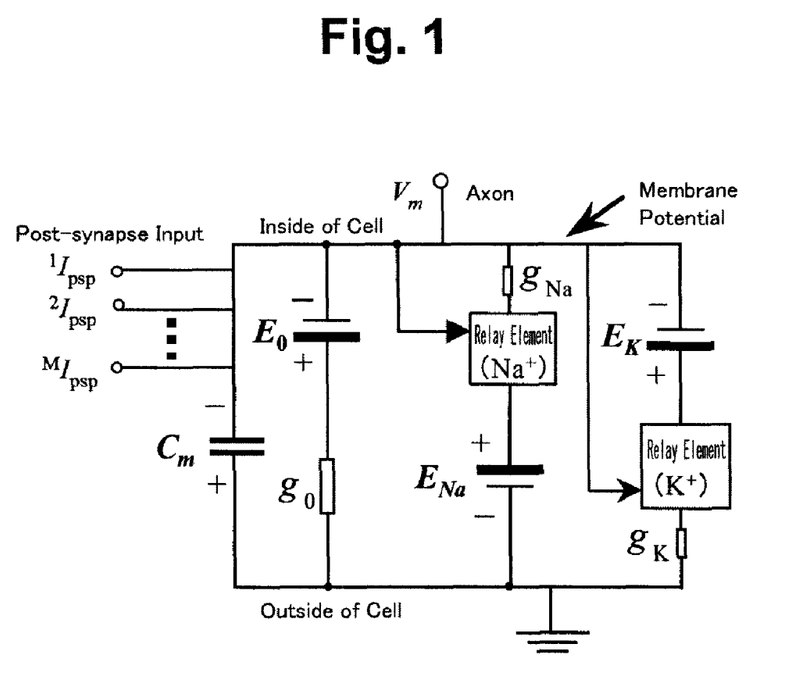
FIG. 1 is a schematic conceptual circuit diagram of a nerve cell body equivalent circuit according to the present invention.

Now, a nerve cell body equivalent circuit will be described below by way of examples that satisfies the above Formula 2 for the relationship between the input signal $I_{psp}(t)$ and the membrane potential $V_m(t)$. FIG. 1 is a schematic conceptual circuit diagram of a nerve cell body equivalent circuit according to the present invention. In the figure, the capacitor $C_m$ corresponds to the electric capacitance of the cell membrane and the potential difference of the capacitor $C_m$ corresponds to the membrane potential of the cell membrane. $E_o$ corresponds to a power source that corresponds to the resting membrane potential and takes the role of an ion pump or an impermeable negative ion. Additionally, $E_{Na}$ and $E_K$ in FIG. 1 are power sources corresponding respectively to the equivalent potential of the ion concentration difference between the extra-cellular fluid and the intra-cellular fluid of sodium ions $Na^+$ and potassium ions $K^+$. In FIG. 1, $g_{Na}$ and $g_K$ are electric conductance that are observed respectively when the ion channel of $Na^+$ and that of $K^+$ in the entire cell membrane are opened. In FIG. 1, $g_o$ is the equivalent conductance relative to the entire permeable ions of the cell membrane. Relay element ($Na^+$) is an element for realizing the electric characteristics of the ion channel of $Na^+$, which element is tuned on when the membrane potential $V_m$ exceeds a predetermined threshold value. Relay element ($K^+$) is an element for realizing the electric characteristics of the ion channels of $K^+$, which element is tuned on when the membrane potential $V_m$ exceeds a predetermined threshold value. There may be a plurality of current inputs from the post-synapse and they are expressed by ${}^1 I_{psp}$ through ${}^M I_{psp}$.

As shown in FIG. 1, the $Na^+$ channel is formed by connecting a power source $E_{Na}$, a relay element ($Na^+$) and an electric resistance $g_{Na}$ in series between the output terminal where the membrane potential $V_m$ is obtained and the reference potential terminal that is grounded. Likewise, the $K^+$ channel is formed by connecting a power source $E_K$, a relay element ($K^+$) and an electric resistance gK in series between the output terminal where the membrane potential $V_m$ is obtained and the reference potential terminal that is grounded. Additionally, a circuit formed by connecting a capacitor $C_m$, a power source $E_o$ and an electric resistance $g_o$ in series is connected in parallel with equivalent circuit of the $Na^+$ channel and that of the $K^+$ channel. With this arrangement, a nerve cell body equivalent circuit is reproduced in principle.

When the membrane potential $V_m$ exceeds a predetermined threshold value, the relay element ($Na^+$) is turned on and an electric current flows into the $Na^+$ channel from the power source $E_{Na}$, so that the membrane potential $V_m$ rapidly rises. At the same time, the relay element ($K^+$) is turned on and the electric charge of the capacitor $C_m$ flows out into the $K^+$ channel, so that the membrane potential $V_m$ rapidly falls. In this way, the illustrated nerve cell body equivalent circuit reproduces the ignition characteristic of a nerve cell body.

If necessary, an equivalent circuit such as a $Ca^+$ channel of calcium ion formed by connecting a power source corresponding to the equivalent potential of the chemical potential of a predetermined ion other than a sodium ion and a potassium ion, a relay element corresponding to the ion channel of the predetermined ion and an electric resistance corresponding to a permeability of the ion channel of the predetermined ion are connected in series may further be connected in parallel with the equivalent circuit of the $Na^+$ channel and that of the $K^+$ channel.

Now, a synapse equivalent circuit according to the present invention will be described in detail below. The inter-nerve cell signal transmission is realized by the pre-synapse and the post-synapse. As the pulse transmitted from the axon reaches the pre-synapse, a predetermined quantity of transmitter substances is discharged into the synaptic cleft from the synaptic vesicle and the ion channels that correspond to the respective transmitter substances located at the post-synapse open. As a result, ions that correspond to the opened channels flow through the channels. In the case an excitatory synapse, the electric potential of the cell membrane rises to give rise to depolarization. In the case of an inhibitory synapse, the electric potential of the cell membrane falls to give rise to hyperpolarization.

Figure 2:
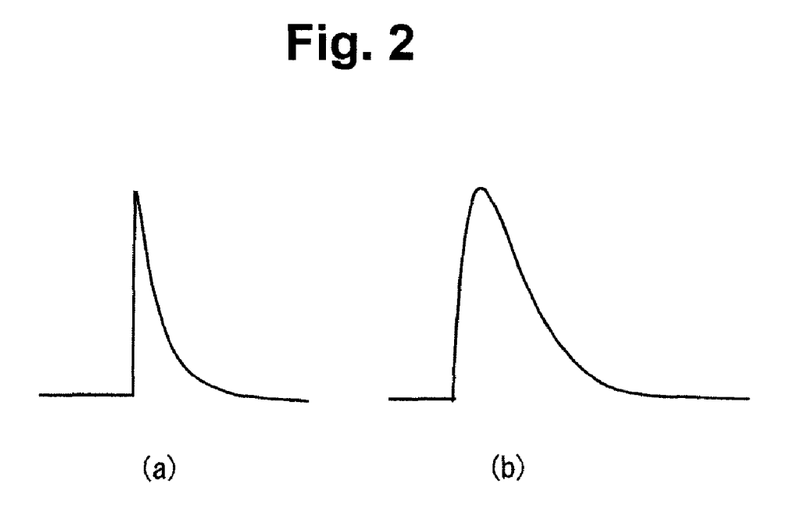
FIG. 2 is a schematic waveform of the post-synaptic potential from an excitatory synapse caused to take place by a pulse.

The time $T_c$ at which the channel opens and the type of channel that opens varies from channel to channel depending on the transmitter substance. Two types of waveforms as shown in FIG. 2 exist as waveforms of the post-synaptic potential from an excitatory synapse that is produced by a pulse. The waveform of (a) in FIG. 2 is close to the first order lag waveform expressed by the formula shown below:

$$f(t) = ke^{-\frac{1}{T}t}$$

wherein k is a constant within the range defined by $0<k<\infty$, and T is a constant within the range defined by $0\leq T\leq\infty$.

The waveform of (b) in FIG. 2 is close to the waveform expressed by the formula shown below:

$$f(t) = k\left(e^{-\frac{1}{T_1}t} - e^{-\frac{1}{T_2}t}\right)$$

wherein $T_1$ and $T_2$ are constant within the ranges defined by $0\leq T_1\leq\infty$ and $0\leq T_2\leq\infty$ respectively.

The waveforms in FIG. 2 show the post-synaptic potentials that are produced by a pulse. Therefore, they correspond to the case where the total number of synapses is N=1 in Formula 1. The membrane potential $V_m(O)$ when the action potential ends is the resting membrane potential $-E_o$. Therefore as seen from Formula 1, the membrane potential $V_m(t)$ can be expressed by the formula shown below when N=1, $V_m(O)=-E_o$ and $I_{psp}(t)$ is a unit impulse.

$$V_m(t) = -E_0 + \frac{1}{C_m}e^{-\frac{g_0}{C_m}t}$$

It will be seen that this also corresponds to the waveform of first order lag of (a) in FIG. 2.

When $I_{psp}$ satisfies the formula shown below:

$$I_{psp}(t) = ke^{-\frac{1}{T}t}$$

the membrane potential $V_m(t)$ can be expressed by the formula shown below.

$$V_m(t) = -E_0 + \frac{kT}{g_0T - C_m}\left(e^{-\frac{1}{T}t} - e^{-\frac{g_0}{C_m}t}\right)$$

It will be seen that the formula shown above corresponds to the waveform of (b) in FIG. 2.

Thus, there are two kinds of post synaptic electric current relative to a unit pulse input from an excitatory synapse as shown below.

$$I_{psp}(t) = k\delta(t)$$

$$I_{psp}(t) = ke^{-\frac{1}{T}t}$$

The relationship between the synapse input and the post-synaptic electric current can be expressed as follows by using transmission function $G_s(s)$ of Laplace transform:

$$I_{psp}(s) = G_s(s)F_{in}(s) \quad \text{[Formula 3]}$$

wherein $F_{in}(s)$ is the Laplace transform of the pulse frequency function $f_{in}(t)$ of the synapse input. Since $f_{in}(t)$ is a pulse frequency function, the shape of the impulse signal of $f_{in}(t)$ can be made to be that of a single pulse signal. In other words, a single pulse signal of $F_{in}(s)$ can be made to be $F_{in}(s)=1$. Since the waveforms of (a) and (b) in FIG. 2 correspond to $F_{in}(s)=1$, $G_s(s)$ can be divided into two types as shown below.

$$G_s(s) = k_P \quad \text{[Formula 4]}$$

$$G_s(s) = \frac{k_I T_I}{T_I s + 1} \quad \text{[Formula 5]}$$

The formula shown below is obtained by rewriting Formula 3 in terms of time domain:

$$I_{psp}(t) = \int_0^t g_s(\tau-t)f_{in}(\tau)d\tau$$

wherein $g_s(t)$ is the time domain form of $G_s(s)$ and hence is an impulse response.

Thus, from the formulas 4 and 5, the relationship between each of the two types of post-synaptic potential output and the input signal is expressed by the formulas shown below.

$$I_{psp}(t) = k_P f_{in}(t) \quad \text{[Formula 6]}$$

$$I_{psp}(t) = k_I \int_0^t e^{-\frac{1}{T_I}(t-\tau)} f_{in}(\tau)d\tau \quad \text{[Formula 7]}$$

wherein $k_P$ is a constant within the range defined by $-\infty<k_P<\infty$, $k_I$ is a constant within the range defined by $-\infty<k_I<\infty$, and $T_I$ is a constant within the range defined by $0<T_I<\infty$.

From the above, in the case of a synapse having a plurality of kinds of transmitter substances including the first transmitter substance and the second transmitter substance, the input signal $f_{in}(t)$ and the output signal $I_{psp}(t)$ of the synapse equivalent circuit have a relationship as defined below:

$$I_{psp}(t) = \sum_{m=1}^{M} {}^m k_P f_{in}(t) + \sum_{l=1}^{L} {}^l k_I \int_0^t e^{-\frac{1}{T_I}(t-\tau)} f_{in}(\tau)d\tau \quad \text{[Formula 8]}$$

wherein L is the total number of the kinds of first transmitter substances that the synapse has, l=1, 2, ..., L and represents the ordinal number of a first transmitter substance of the synapse, and M is the total number of the kinds of second transmitter substances that the synapses has, m=1, 2, ..., M and represents the ordinal number of a second transmitter substance of the synapse.

Note that, as for the constants $k_P$ and $k_I$, they take a positive value in the case of an excitatory synapse and a negative value in the case of an inhibitory synapse. By designing the values of the constants $k_P$ and $k_I$, Formula 8 can be made to express any synapse. For example, it is only necessary to use $k_I$=0 in order to express a synapse having only the first transmitter substance.

Figure 3:
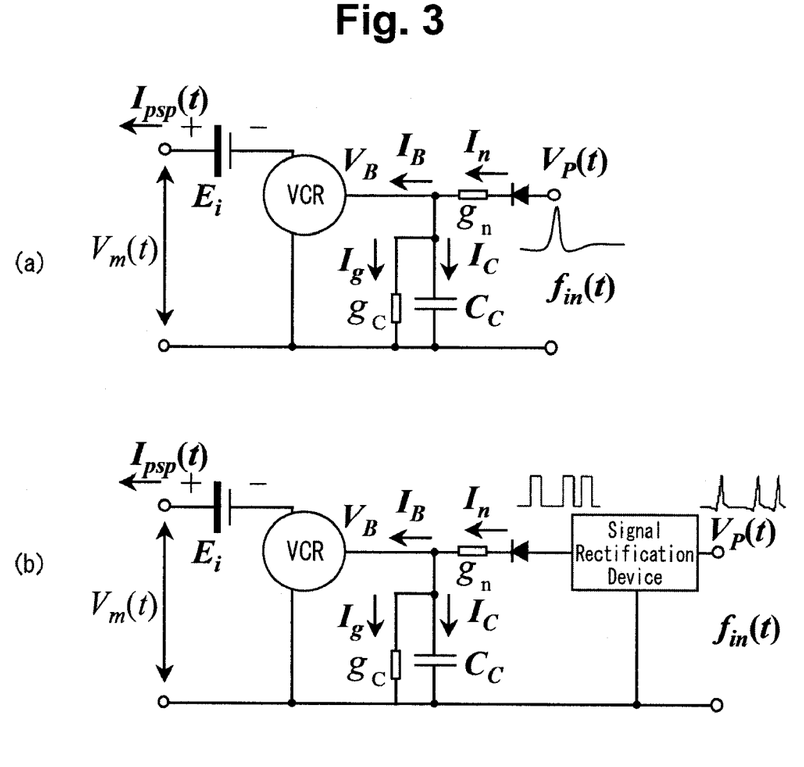
FIG. 3 is a schematic conceptual circuit diagram of a synapse equivalent circuit according to the present invention.

Now, a specific example of synapse equivalent circuit where the relationship between input signal $f_{in}(t)$ and output signal $I_{psp}(t)$ satisfies Formula 7 will be described below. In FIG. 3, (a) is a schematic conceptual circuit diagram of a synapse equivalent circuit according to the present invention. In the figure, $V_P(t)$ is the external input voltage and $V_B(t)$ is the control voltage of the voltage control resistance section, whereas $E_i$ is the equivalent potential of the chemical potential of the corresponding ion and electric resistor $g_n$, electric resistor $g_c$ and capacitor $C_c$ form an RC circuit element for realizing the characteristic of a second transmitter substance of Formula 8. In addition, VCR (voltage control resistance section) changes its resistance value according to the magnitude of the control voltage just like a FET or some other transistor. Considering a situation where the input signal $f_{in}(t)$ shows an irregular shape under the influence of attenuation and/or noise, the waveforms of input pulses can be regulated to show a same profile by making the input signal $f_{in}(t)$ input through a signal rectification device as shown in (b) of FIG. 3.

As shown, the input terminal of the synapse equivalent circuit is connected to the control terminal of the voltage control resistance section through electric resistor $g_n$ and the output terminal of the synapse equivalent circuit is connected to the voltage control resistance section through power source $E_i$.

The electric potential between the electric resistor $g_n$ and the control terminal of the voltage control resistance section is connected to a reference potential through a parallel circuit where the electric resistor $g_c$ and the capacitor $C_c$ are connected in parallel. The parallel circuit corresponds to the second transmitter substance. When this parallel circuit is not employed, it corresponds to a synapse having only the first transmitter substance. The input/output relationship of the nerve equivalent circuit can be made to be of the second order by connecting a coil or the like in parallel with the parallel circuit.

From the circuit diagrams of FIG. 3, the following formulas are established.

$$I_n(t) = I_C(t) + I_g(t) + I_B(t)$$

$$I_n(t) = g_n(V_P(t) - V_B(t))$$

$$I_C(t) = C_C \frac{dV_B(t)}{dt}$$

$$I_g(t) = g_C V_B(t)$$

$$I_B(t) \approx 0$$

From these formulas, the following formulas are established.

$$g_n V_P(t) - g_n V_B(t) = C_C \frac{dV_B(t)}{dt} + g_C V_B(t) \quad \text{[Formula 9]}$$

$$\frac{dV_B(t)}{dt} = -\frac{g_C + g_n}{C_C} V_B(t) + \frac{g_n}{C_C} V_P(t) \quad \text{[Formula 10]}$$

$$V_B(t) = V_B(0)e^{-\frac{g_C+g_n}{C_C}t} + \frac{1}{C_C}\int_0^t e^{-\frac{g_C+g_n}{C_C}(\tau-t)} g_n V_P(\tau) d\tau$$

Note that $g_n V_p(t)$ is the current $I_n(t)$ when $V_B(t)$=0. If $V_p(t)$ that is an external input is taken for a pulse train, all the pulses have the same shape when $V_B(t)$=0 and hence an electric charge $q_{in}$ passes the resistance element $g_n$ at each pulse. Therefore, when viewed averagely for a predetermined time period, the following formula is established.

$$g_n V_P(t) = q_{in} f_{in}(t)$$

The formulas shown below are obtained by putting the above formula into Formula 9 and Formula 10 as substitute.

$$\frac{dV_B(t)}{dt} = -\frac{g_C+g_n}{C_C} V_B(t) + \frac{q_{in}}{C_C} f_{in}(t)$$

$$V_B(t) = V_B(0)e^{-\frac{g_C+g_n}{C_C}t} + \frac{q_{in}}{C_C}\int_0^t e^{-\frac{g_C+g_n}{C_C}(\tau-t)} f_{in}(\tau)d\tau$$

Therefore, it is sufficient for the transistor or the like of the voltage control resistance section to satisfy the formula shown below:

$$I_{psp}(t) \approx k_T V_B(t)$$

wherein $k_T$ is a constant that is determined as a function of the type of the channel to be expressed and the type and the quantity of transmitter substance.

The formula shown below is obtained from the formula shown above.

$$I_{psp}(s) = k_T V_B(0)e^{-\frac{g_C+g_n}{C_C}t} + k_T \frac{q_{in}}{C_C}\int_0^t e^{-\frac{g_C+g_n}{C_C}(\tau-t)} f_{in}(\tau)d\tau$$

Therefore, from the formula shown above, it will be seen that the synapse equivalent circuit of FIG. 3 satisfies the input/output relationship of Formula 7. Various characteristics of synapse can be realized by adjusting the values of capacitance, resistance and so on of $C_c$, $g_n$, $g_c$ and $k_T$ that are parameters. Additionally, the characteristic of synapse that satisfies the input/output relationship of Formula 6 can be realized by removing the parallel circuit of $C_c$ and $g_c$ (in other words, by making $C_c$=0 and $g_c$=0).

Figure 4:
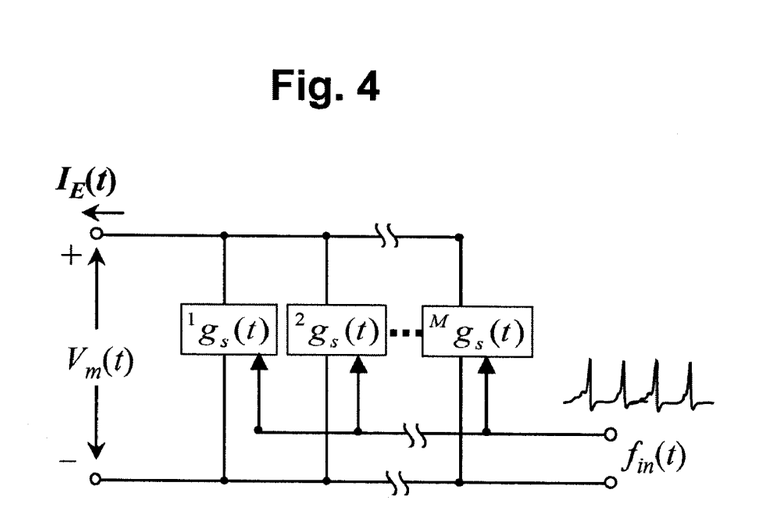
FIG. 4 is a schematic conceptual circuit diagram of a synapse equivalent circuit having a plurality of kinds of transmitter substances.

Synapse equivalent circuits other than those shown in FIG. 3 are also conceivable. A synapse equivalent circuit according to the present invention is required only to realize the input/output relationship of Formula 6 or Formula 7. It is sufficient for a synapse equivalent circuit having a plurality of types of transmitter substance to realize the input/output relationship of Formula 8. The relationship can typically be realized by a circuit as shown in FIG. 4. In FIG. 4, $^m g_s(t)$ represents the circuit shown in FIG. 3.

Figure 5:
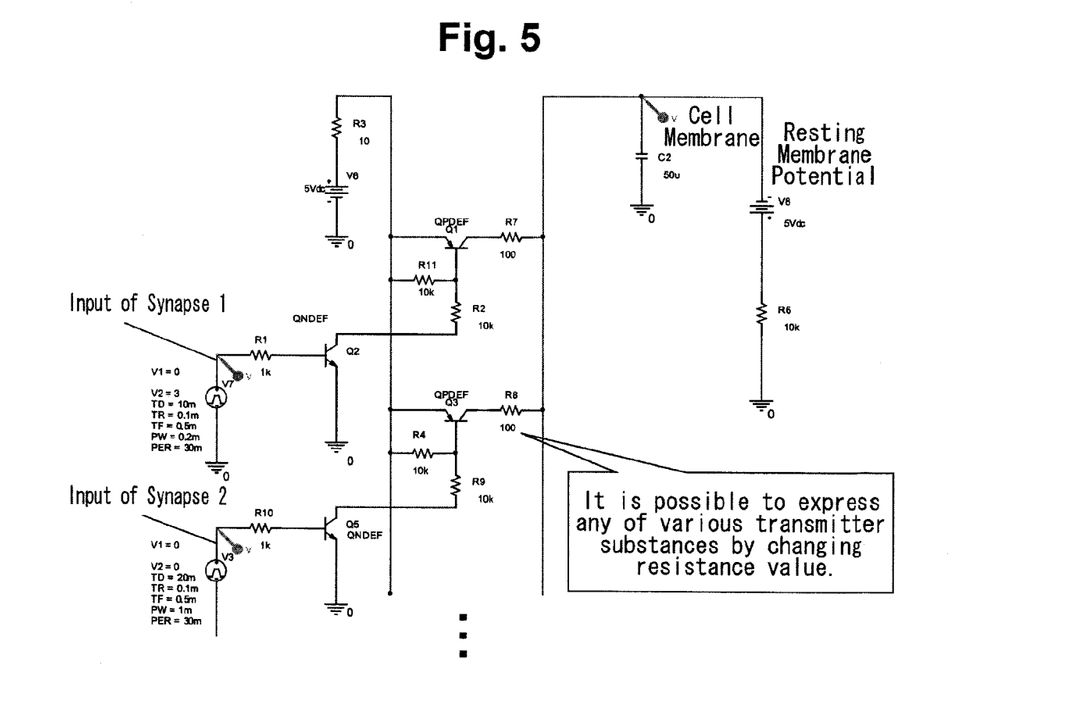
FIG. 5 is a more specific exemplary circuit diagram for the synapse equivalent circuit shown in FIG. 3.
Figure 6:
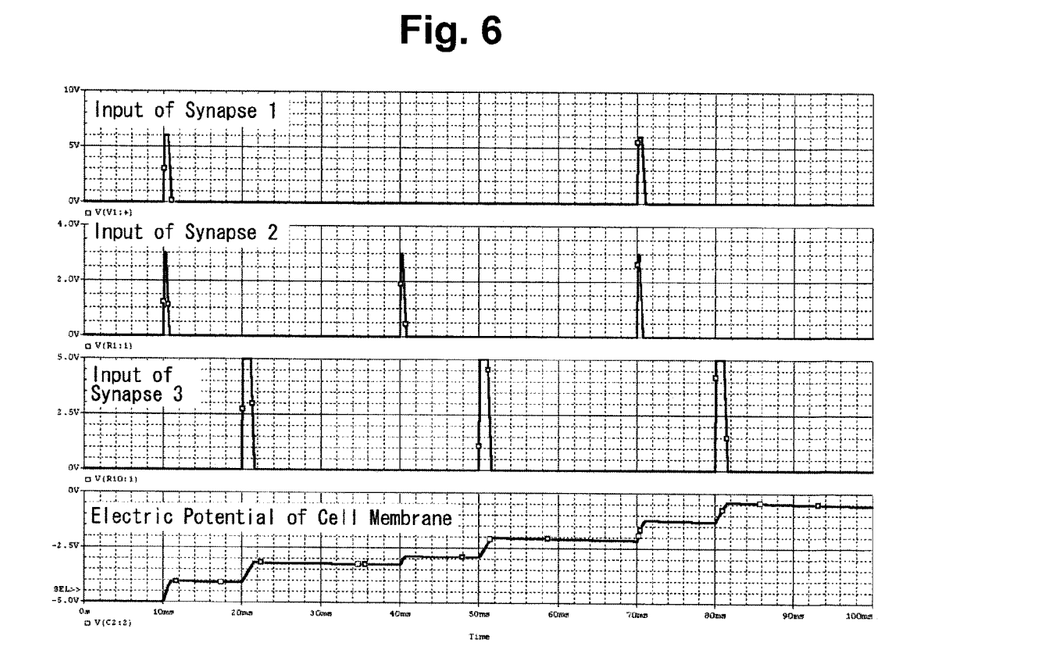
FIG. 6 is a graph illustrating an exemplary input/output relationship of the synapse equivalent circuit shown in FIG. 5.

FIG. 5 shows a more specific exemplary synapse equivalent circuit. FIG. 5 is a synapse equivalent circuit for realizing an excitatory synapse having the first transmitter substance. The circuit of FIG. 5 is an excitatory synapse equivalent circuit for realizing a transmitter substance that acts on channels of the same type ions. Note that the voltage of V6 varies when the type of ions to be acted upon differs. FIG. 6 is a graph illustrating an exemplary input/output relationship of the synapse equivalent circuit of FIG. 5, using a temporal axis. It will be seen that the membrane potential gradually rises as pulse trains are input from three synapses. Synapses having any of various different first transmitter substances can be realized by changing the resistance values (R2, R7, R11 and R4, R8, R9, etc.)

Figure 7:
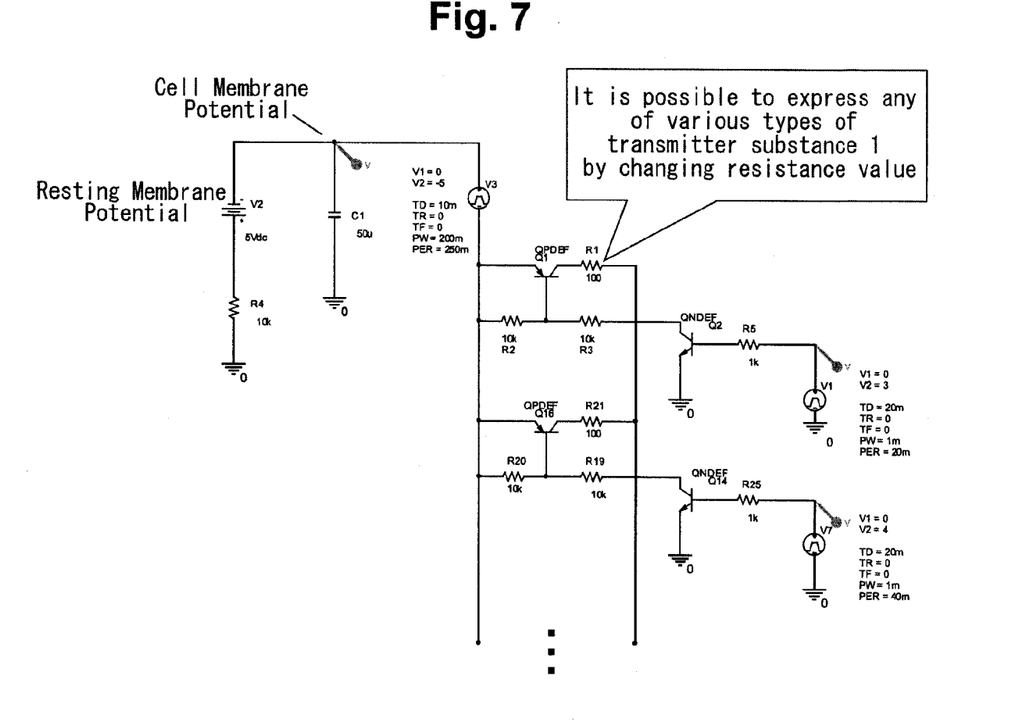
FIG. 7 is a specific exemplary synapse equivalent circuit diagram for realizing an inhibitory synapse having a first transmitter substance.
Figure 8:
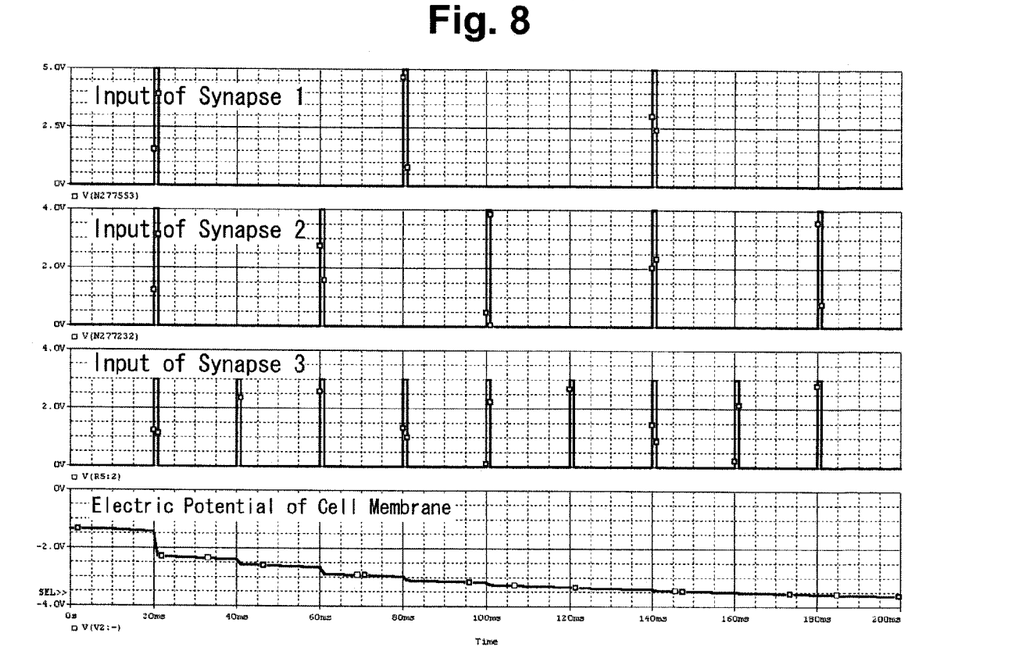
FIG. 8 is a graph illustrating an exemplary input/output relationship of the synapse equivalent circuit shown in FIG. 7.

FIG. 7 is a specific exemplary synapse equivalent circuit diagram for realizing an inhibitory synapse having a first transmitter substance. The circuit of FIG. 7 is an inhibitory synapse equivalent circuit for realizing a transmitter substance that acts on channels of the same type ions. Note that the voltage of V3 varies when the type of ions to be acted upon differs. FIG. 8 is a graph illustrating an exemplary input/output relationship of the synapse equivalent circuit of FIG. 7, using a temporal axis. It will be seen that the membrane potential gradually falls as pulse trains are input from three synapses. Synapses having any of various different first transmitter substances can be realized by changing the resistance values (R1, R2, R3 and R19, R20, R21, etc.).

Now, the overall nerve equivalent circuit or the relationship between nerve cell bodies and synapses will be described below. When a nerve cell body is ignited, the $Na^+$ and $K^+$ channels are opened and closed, so that a predetermined electric charge $q_p$ flows out of the nerve cell body at each pulse. Since the pulse shape that is the action potential of each nerve cell body is the same for all the nerve cell bodies, the electric charge $q_p$ is held constant in each nerve cell body. If the ignition frequency of a nerve cell body is $f_{out}(t)$, the electric current $I_{out}(t)$ that flows out as a result of ignition of the nerve cell body is expressed by the formula shown below.

$$I_{out}(t) = q_p f_{out}(t)$$

The electric current that passes the post-synapse is expressed by the formula shown below:

$$\sum_{n=1}^{N} {}^n I_{psp}(t)$$

wherein ${}^n I_{psp}$ is the electric current that is made to flow out/in by the n-th synapse and N is the total number of synapses in the nerve cell body.

When the membrane potential other than the action potential is approximated as resting membrane potential, the electric current that passes the membrane can be made equal to 0 because all the ions in the resting state are held in a state of equilibrium. When the electric capacitance of the cell membrane is taken for a capacitor, repetition of ignition and rest of a cell can be considered as repetition of charge and discharge of a capacitor. When the charges and discharges are viewed in a constant time zone, the move of an electric charge can be regarded as 0. Thus, the formula shown below is established.

$$\sum_{n=1}^{N} {}^n I_{psp}(t) - q_P f_{out}(t) \approx 0$$

Therefore, the formula shown below can be obtained by putting the above formula into Formula 8 as substitute.

$$f_{out}(t) = \frac{1}{q_P} \sum_{n=1}^{N} \left( \sum_{m=1}^{M} {}^{nm}k_P {}^n f_{in}(t) + \sum_{l=1}^{L} {}^{nl}k_I \int_0^t e^{-\frac{1}{{}^{nl}T_I}(\tau-t)} {}^n f_{in}(\tau) d\tau \right)$$

By making $k_P$ and $k_I$ include $q_p$, the input signal $f_{in}(t)$ and the output signal $f_{out}(t)$ of the nerve equivalent circuit has a relationship defined by the formula shown below.

$$f_{out}(t) = \sum_{n=1}^{N} \left( \sum_{m=1}^{M} {}^{nm}k_P {}^n f_{in}(t) + \sum_{l=1}^{L} {}^{nl}k_I \int_0^t e^{-\frac{1}{{}^{nl}T_I}(\tau-t)} {}^n f_{in}(\tau) d\tau \right) \quad \text{[Formula 11]}$$

The formula shown below can be obtained by subjecting the above formula to Laplace transform.

$$F_{out}(s) = \left( \sum_{n=1}^{N} \sum_{m=1}^{M} {}^{nm}k_P + \sum_{n=1}^{N} \sum_{l=1}^{L} \frac{{}^{nl}k_I {}^{nl}T_I}{{}^{nl}T_I s + 1} \right) {}^n F_{in}(s)$$

As seen from the above formula and Formula 11, the nerve equivalent circuit can realize additions, subtractions, proportionments and integrations of inputs. Note, however, that, since general integrations are integrations involving omissions, $T_I = \infty$ needs to be defined for genuine integrations.

Figure 9:
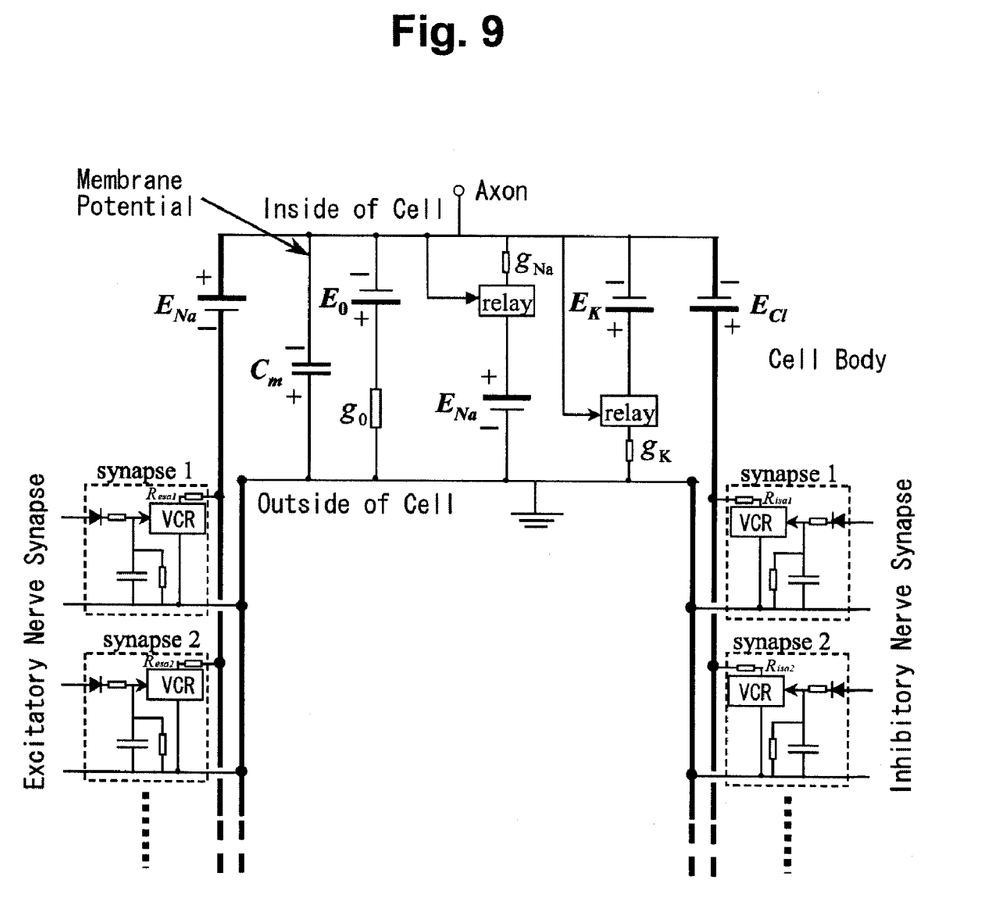
FIG. 9 is a schematic conceptual circuit diagram of an entire nerve equivalent circuit according to the present invention.

An entire nerve equivalent circuit as shown in FIG. 9 can be formed by integrally combining the above-described synapse equivalent circuits and nerve cell body equivalent circuits. As shown in FIG. 9, a plurality of synapse equivalent circuits is connected to a nerve cell body equivalent circuit so as to operate as a plurality of excitatory synapses and a plurality of inhibitory synapses. Note that an ordinary amplifier can be used for the VCR (voltage control resistance section) to realize similar characteristics. In FIG. 9, $R_{esa}$ and $R_{isa}$ indicate resistance values that are the functions of the distance from the synapse to the axon initial segment.

Figure 10:
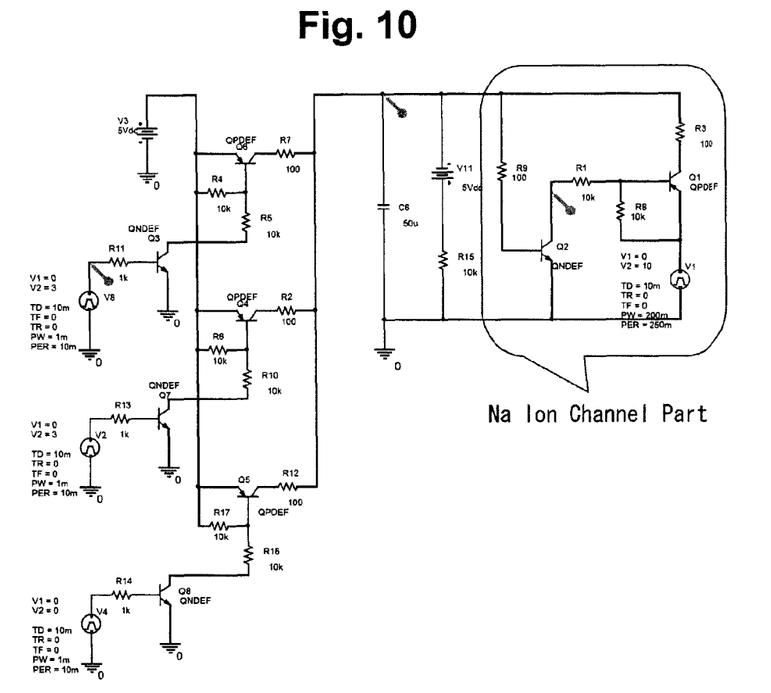
FIG. 10 is a more specific exemplary circuit diagram of a nerve equivalent circuit according to the present invention.

FIG. 10 is a more specific exemplary circuit diagram of a nerve equivalent circuit according to the present invention. The circuit shown in FIG. 10 is formed by connecting a synapse equivalent circuit for realizing excitatory synapses and a nerve cell body equivalent circuit of $Na^+$ channel. The nerve equivalent circuit in FIG. 10 connects an excitatory synapse equivalent circuit having a first transmitter substance and a nerve cell body equivalent circuit of $Na^+$ channel, and FIG. 11 is a graph illustrating an exemplary input/output relationship thereof.

Figure 11:
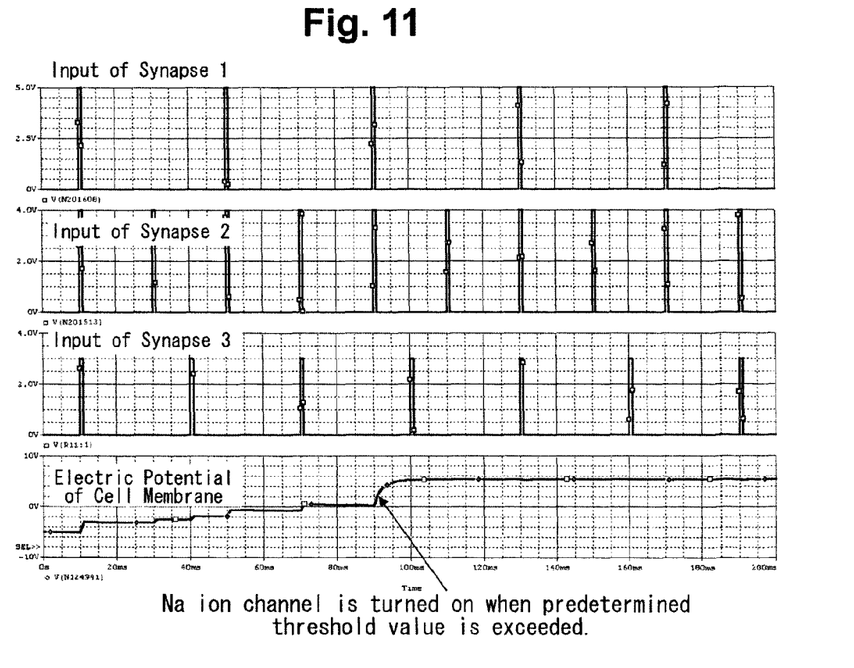
FIG. 11 is a graph illustrating an exemplary input/output relationship of the nerve equivalent circuit shown in FIG. 10.

As shown in FIG. 11, as the electric potential of the capacitor, or the membrane potential, rises to exceed a predetermined threshold value, the transistor is turned on and the potential of V1 flows through the entire circuit. As a result, an excited state of a cell membrane can be simulated. While it is known that the $Na^+$ channel is inactivated when the membrane potential keeps on rising in an actual nerve cell, this characteristic is not taken into consideration in the circuit of FIG. 10 because it can be disregarded by using a $K^+$ channel in combination. However, if necessary, this inactivation characteristic may be realized by means of an electric circuit.

Figure 12:
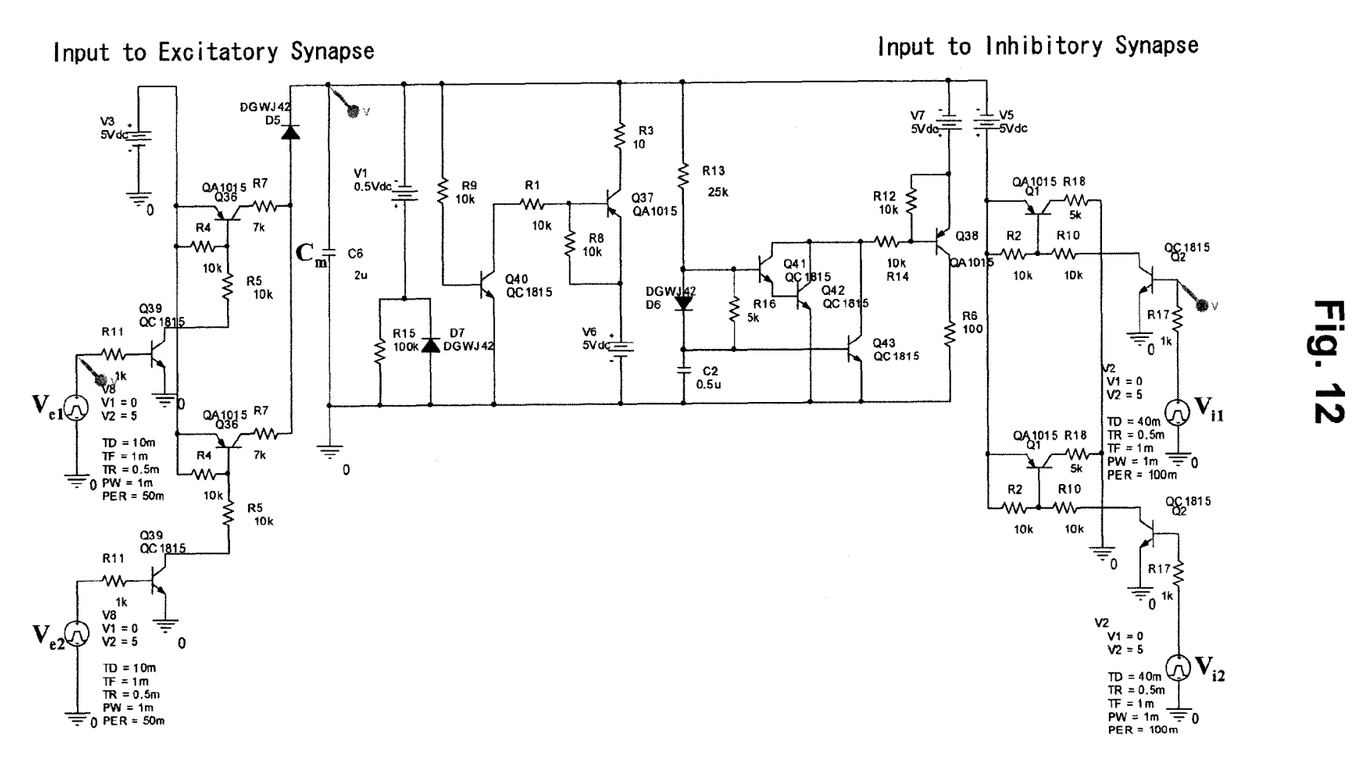
FIG. 12 is a more specific exemplary circuit diagram of an entire nerve equivalent circuit according to the present invention.
Figure 13:
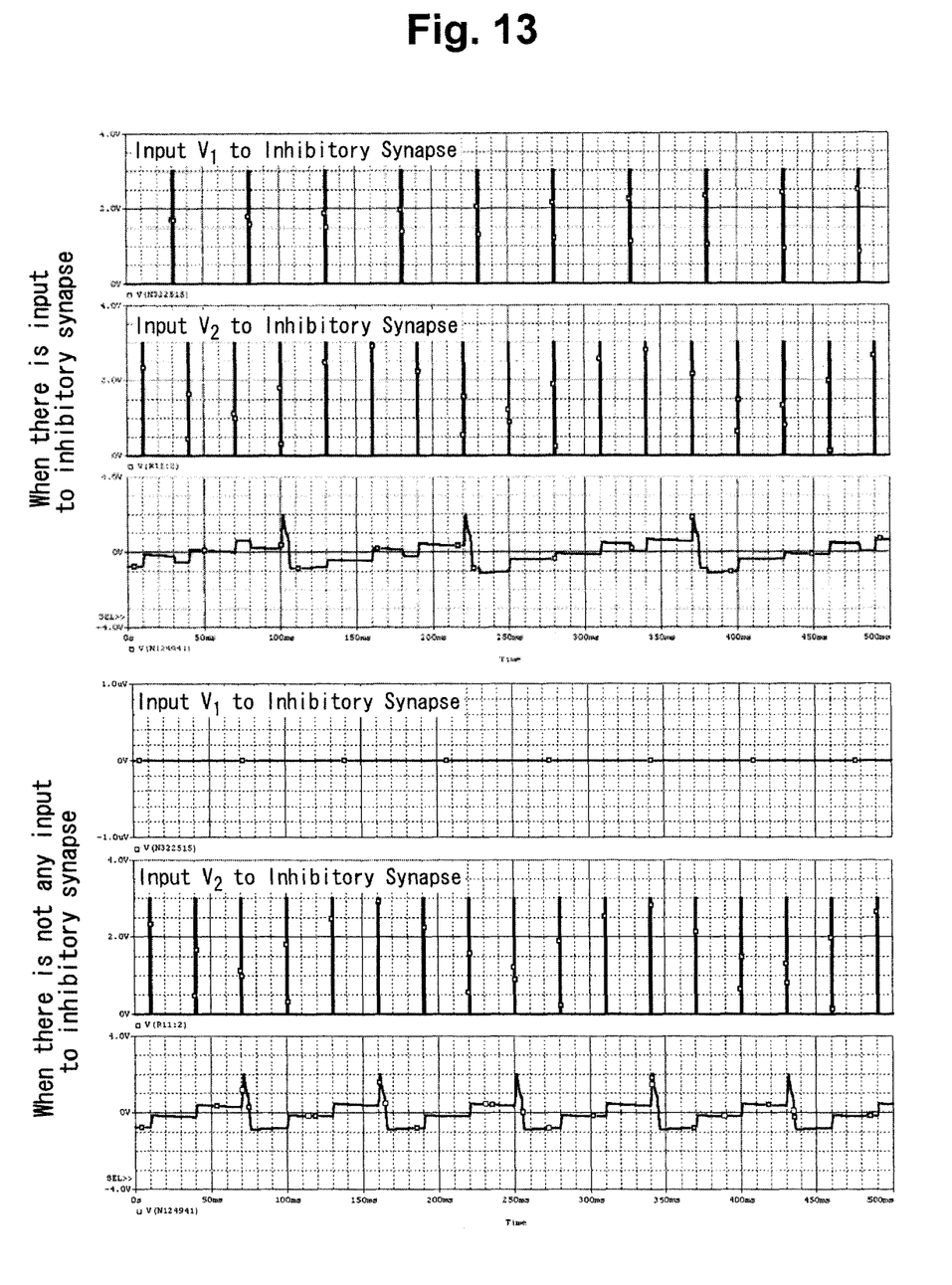
FIG. 13 is a graph illustrating an exemplary input/output relationship of the nerve equivalent circuit shown in FIG. 12.

FIG. 12 is a more specific exemplary circuit diagram of an entire nerve equivalent circuit according to the present invention that employs a K$^+$ channel in combination. The nerve equivalent circuit of FIG. 12 is formed by connecting an excitatory synapse equivalent circuit having a first transmitter substance, an inhibitory synapse equivalent circuit having a first transmitter substance and a nerve cell body equivalent circuit having a Na$^+$ channel and a K$^+$ channel. FIG. 13 is a graph illustrating an exemplary input/output relationship of the nerve equivalent circuit of FIG. 12.

Figure 14:
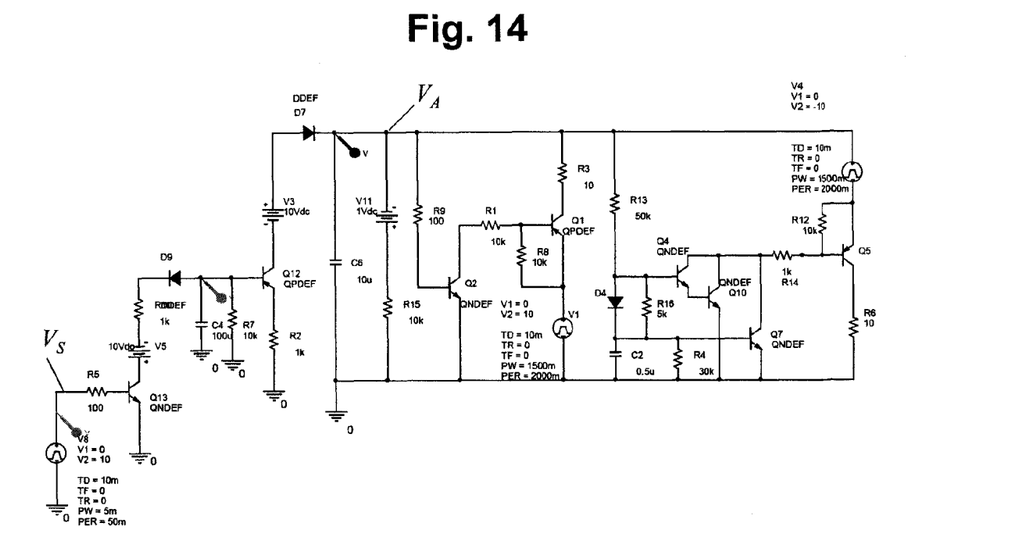
FIG. 14 is another more specific exemplary circuit diagram of an entire nerve equivalent circuit according to the present invention.
Figure 15:
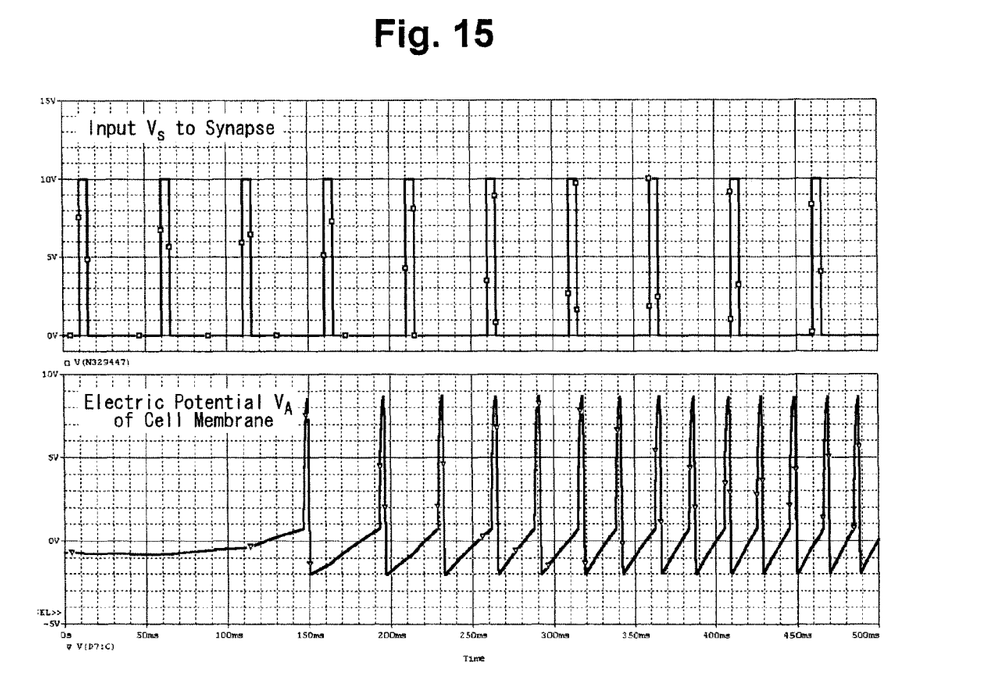
FIG. 15 is a graph illustrating an exemplary input/output relationship of the nerve equivalent circuit shown in FIG. 14.

FIG. 14 is another more specific exemplary circuit diagram of a nerve equivalent circuit of an entire nerve cell according to the present invention. The nerve equivalent circuit of FIG. 14 is formed by connecting an excitatory synapse equivalent circuit having a second transmitter substance and a nerve cell body equivalent circuit having a Na$^+$ channel and a K$^+$ channel. FIG. 15 is a graph illustrating an exemplary input/output relationship of the nerve equivalent circuit of FIG. 14. As seen from FIG. 15, the input/output relationship is an integration relationship having omissions.

Figure 16:
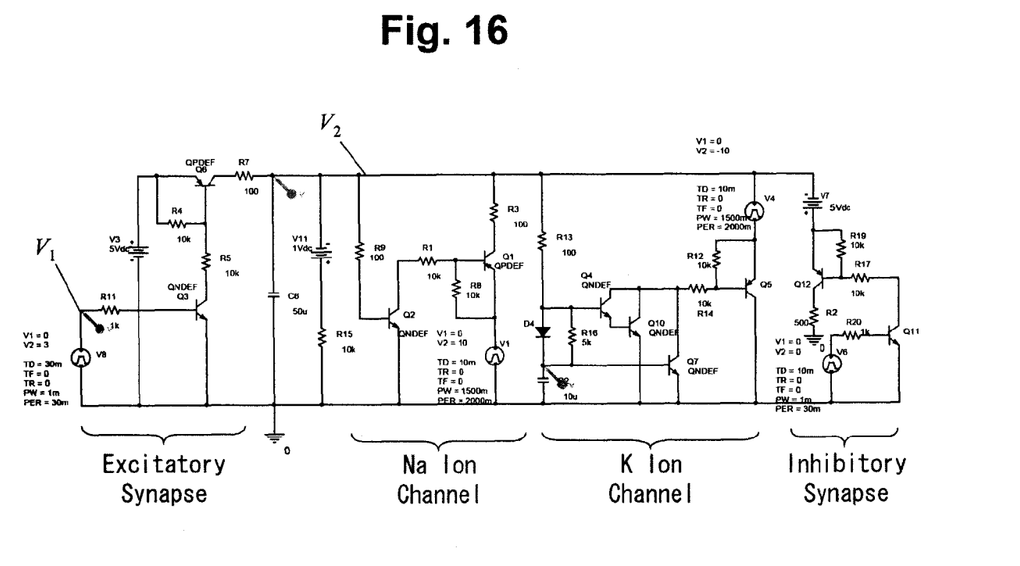
FIG. 16 is another more specific exemplary circuit diagram of an entire nerve equivalent circuit according to the present invention.
Figure 17:
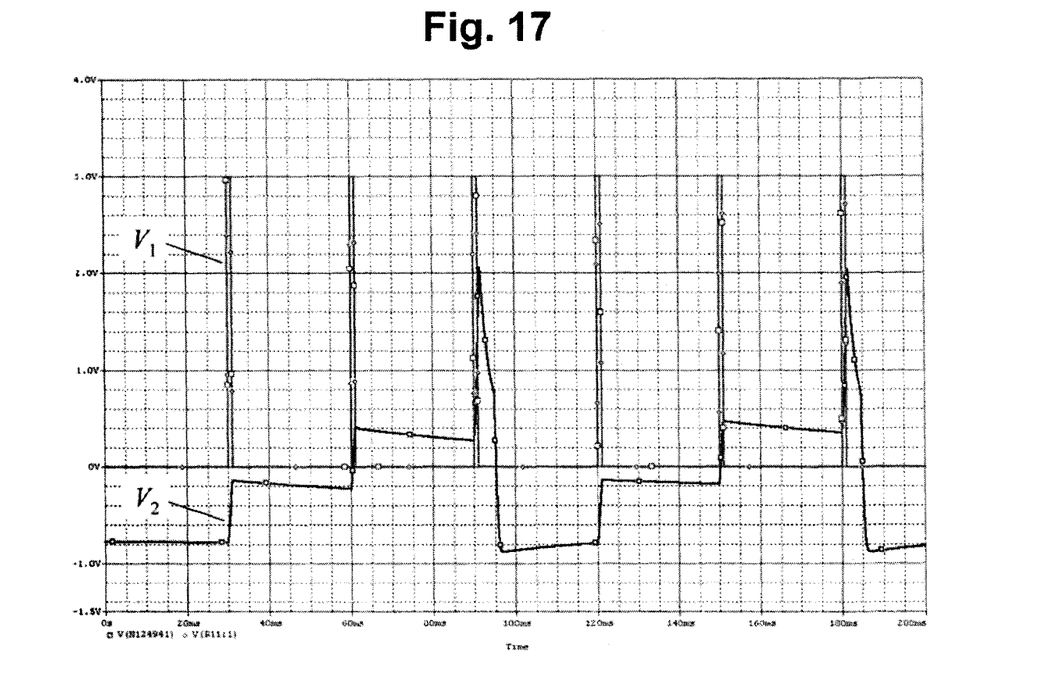
FIG. 17 is a graph illustrating the relationship between the input signal and the membrane potential of the nerve cell body equivalent circuit shown in FIG. 16.

FIG. 16 is another more specific exemplary circuit diagram of a nerve equivalent circuit of an entire nerve cell according to the present invention. The nerve equivalent circuit of FIG. 16 is formed by connecting an excitatory synapse equivalent circuit having a first transmitter substance and a nerve cell body equivalent circuit having a Na$^+$ channel and a K$^+$ channel, and FIG. 17 is a graph illustrating an exemplary input/output relationship thereof. As seen from FIG. 17, a pulse is output as output signal for three pulses that are input as input signals to establish a proportional relationship of $f_{out}(t)=\frac{1}{3}f_{in}(t)$.

As described above, various nerve equivalent circuits can be realized by combining elements selected from first transmitter substances, second transmitter substances, excitatory synapses, inhibitory synapses, Na$^+$ channels and K$^+$ channels.

While individual nerve equivalent circuits may exist by themselves alone, a plurality of such nerve equivalent circuits may be connected to each other to form a circuit as in the case of real nerve cells. More specifically, such a circuit may be formed by connecting the output terminal of a nerve cell body equivalent circuit to the input terminal of a synapse equivalent circuit and so on or by connecting the output terminals of a plurality of synapse equivalent circuits to the input terminal of a nerve cell body equivalent circuit, while connecting the output terminal of a nerve cell body equivalent circuit to the input terminals of a plurality of still other synapse equivalent circuits. Furthermore, signals from an environment sensory section including a temperature sensor and/or a pressure sensor that senses the external environment may be input to the synapse equivalent circuits. The output signal of the nerve cell body equivalent circuit may be used as a control signal for external objects to be controlled, namely actuators.

While the above description is given by referring to circuit diagrams, the present invention is by no means limited thereto and the present invention can be embodied as a program that can be executed on a computer. As a nerve equivalent circuit, a synapse equivalent circuit and a nerve cell body equivalent circuit according to the present invention can be expressed by means of formulas, they can be embodied as programs with ease. Such programs can be realized very easily even when a large scale nerve circuit is simulated.

A nerve equivalent circuit according to the present invention is by no means limited to the illustrated examples described above, which may be modified and altered in various different ways without departing from the spirit and scope of the present invention. For example, since pulses and analog signals can be used respectively as inputs to and outputs from a synapse equivalent circuit according to the present invention, it can be applied by itself to a converter or the like for converting a pulse frequency modulation signal to an analog signal. Additionally, since analog signals and pulse signals can be used respectively as inputs to and outputs from a nerve cell body equivalent circuit according to the present invention, it can be applied by itself to a converter or the like for converting an analog signal into a pulse frequency modulation signal.

What is claimed is:

1. A synapse equivalent circuit for simulating electric characteristics of synapses, comprising an input terminal and an output terminal, an input signal $f_{in}(t)$ input to the input terminal and an output signal $I_{psp}(t)$ output from the output terminal having the relationship expressed by the formula shown below:

$$I_{psp}(t) = \sum_{m=1}^{M} {}^m k_P f_{in}(t) + \sum_{l=1}^{L} {}^l k_I \int_0^t e^{-\frac{1}{T_I}(t-\tau)} f_{in}(\tau) d\tau$$

wherein $k_P$ is a constant within a range defined by $-\infty < k_P < \infty$, $k_I$ is a constant within the range defined by $-\infty < k_I < \infty$, $T_I$ is a constant within the range defined by $0 < T_I \leq \infty$, L is the total number of the kinds of first transmitter substances that synapses have, $l=1, 2, \ldots, L$ and represents the ordinal number of a first transmitter substance of synapses, M is the total number of the kinds of second transmitter substances that synapses have, $m=1, 2, \ldots, M$ and represents the ordinal number of a second transmitter substance of synapses, e is the Napier's constant, t is time, and $\tau$ is the time from t=0 to the current time.

2. The synapse equivalent circuit according to claim 1, wherein the input terminal is connected to a control terminal of a voltage control resistance section through an electric resistance, and the output terminal is connected to the voltage control resistance section through a power source.

3. The synapse equivalent circuit according to claim 2, wherein an electric potential between the electric resistance and the voltage control resistance section is connected to a reference potential through a parallel circuit where a second electric resistance and a capacitor are connected in parallel.

4. The synapse equivalent circuit according to claim 3, wherein the parallel circuit further has a coil connected in parallel.

5. The synapse equivalent circuit according to claim 1, wherein the input terminal is connected to an environment sensory section.

6. The synapse equivalent circuit according to claim 1, wherein the input signal $f_{in}(t)$ is input to the input terminal through a signal rectification device.

7. A nerve cell body equivalent circuit for simulating electric characteristics of nerve cell bodies, the nerve cell body equivalent circuit comprising an input terminal and an output terminal, an input signal $I_{psp}(t)$ input to the input terminal and a membrane potential $V_m(t)$ output from the output terminal having the relationship expressed by the formula shown below:

$$V_m(t) = \begin{cases} -E_0 + (E_0 + V_m(t_0))e^{-\frac{1}{T_m}(t-t_0)} + \\ k_m \int_{t_0}^t e^{-\frac{1}{T_m}(t-\eta)} \sum_{n=1}^{N} {}^n I_{psp}(\eta) d\eta & V_m(t) < \sigma \\ \delta(\tau - t) & V_m(t) \geq \sigma \end{cases}$$

wherein $E_0$ is a resting membrane potential, $k_m$ is a constant within the range defined by $0 < k_m < \infty$, $T_m$ is a constant within the range defined by $0 < T_m \leq \infty$, N is the total number of synapses, $n=1, 2, \ldots, N$ and represents the ordinal number of a synapse connected to the nerve cell, e is the Napier's constant, t is time, $t_0$ is the time when the preceding pulse ended, $\tau$ is the time from t=0 to the current time, $\eta$ is the time from $t=t_0$ to the current time, $\sigma$ is the threshold value of an active potential of nerve cell membrane, and $\delta(t)$ is an impulse function.

8. The nerve cell body equivalent circuit according to claim 7, wherein the nerve cell body equivalent circuit is constituted by connecting, in parallel between the output terminal and a reference potential terminal, a capacitor corresponding to the cell membrane capacitance;

a circuit where a power source corresponding to the resting membrane potential and an electric resistance corresponding to a permeability of cell membrane are connected in series; and a sodium ion channel equivalent circuit where a power source corresponding to an equivalent potential of a chemical potential of a sodium ion, a relay element corresponding to a sodium ion channel, and an electric resistance corresponding to a permeability of a sodium ion channel are connected in series.

9. The nerve cell body equivalent circuit according to claim 8, wherein the nerve cell body equivalent circuit is constituted by further connecting, in parallel between the output terminal and the reference potential terminal, a potassium ion channel equivalent circuit where a power source corresponding to the equivalent potential of a chemical potential of a potassium ion, a relay element corresponding to a potassium ion channel, and an electric resistance corresponding to a permeability of the potassium ion channel are connected in series.

10. The nerve cell body equivalent circuit according to claim 8, wherein the nerve cell body equivalent circuit is constituted by further connecting, in parallel between the output terminal and the reference potential terminal, an ion channel equivalent circuit where a power source corresponding to the equivalent potential of the chemical potential of a predetermined ion other than a sodium ion and a potassium ion, a relay element corresponding to the ion channel of the predetermined ion, and an electric resistance corresponding to a permeability of the ion channel of the predetermined ion are connected in series.

11. The nerve cell body equivalent circuit according to claim 7, wherein the output terminal is connected to an object to be controlled by the nerve cell body equivalent circuit.

12. A nerve equivalent circuit for simulating electric characteristics of a nerve cell, in which an input signal $f_{in}(t)$ and an output signal $f_{out}(t)$ thereof have a relationship expressed by the formula shown below:

$$f_{out}(t) = \sum_{n=1}^{N} \left( \sum_{m=1}^{M} {}^{nm} k_P^n f_{in}(t) + \sum_{l=1}^{L} {}^{nl} k_I \int_0^t e^{-\frac{1}{T_I}(t-l)n} f_{in}(\tau) d\tau \right)$$

wherein $k_P$, is a constant within a range defined by $-\infty < k_P < \infty$, $k_I$ is a constant within the range defined by $-\infty < k_I < \infty$, $T_I$ is a constant within the range defined by $0 < T_I \leq \infty$, N is the total number of synapses, $n=1, 2, \ldots, N$ and represents the ordinal number of a synapse connected to the nerve cell, M is the total number of the kinds of first transmitter substances that synapses have, $m=1, 2, \ldots, M$ and represents the ordinal number of an n-th first transmitter substance of synapses, L is the total number of the kinds of second transmitter substances that synapses have, $l=1, 2, \ldots, L$ and represents the ordinal number of an n-th second transmitter substance of synapses, e is the Napier's constant, t is time, and $\tau$ is the time from t=0 to the current time.

13. The nerve equivalent circuit according to claim 12, in which the output terminal of a synapse equivalent circuit is connected to the input terminal of a nerve cell body equivalent circuit, the synapse equivalent circuit for simulating electric characteristics of synapses, comprising an input terminal and an output terminal, an input signal $f_{in}(t)$ input to the input terminal and an output signal $I_{psp}(t)$ output from the output terminal having the relationship expressed by the formula shown below:

$$I_{psp}(t) = \sum_{m=1}^{M} {}^m k_P f_{in}(t) + \sum_{l=1}^{L} {}^l k_I \int_0^t e^{-\frac{1}{l}(t-l)} {}^n f_{in}(\tau) d\tau$$

wherein $k_P$ is a constant within a range defined by $-\infty < k_P < \infty$, $k_I$ is a constant within the range defined by $-\infty < k_I < \infty$, $T_I$ is a constant within the range defined by $0 < T_I \leq \infty$, L is the total number of the kinds of first transmitter substances that synapses have, I=1, 2, ..., L and represents the ordinal number of a first transmitter substance of synapses, M is the total number of the kinds of second transmitter substances that synapses have, m=1, 2, ..., M and represents the ordinal number of a second transmitter substance of synapses, e is the Napier's constant, t is time, and τ is the time from t=0 to the current time, the nerve cell body equivalent circuit for simulating electric characteristics of nerve cell bodies, the nerve cell body equivalent circuit comprising an input terminal and an output terminal, an input signal $I_{psp}(t)$ input to the input terminal and a membrane potential $V_m(t)$ output from the output terminal having the relationship expressed by the formula shown below:

$$V_m(t) = \begin{cases} -E_0 + (E_0 + V_m(t_0))e^{-\frac{1}{T_m}(t-t_0)} + \\ k_m \int_{t_0}^{t} e^{-\frac{1}{T_m}(t-\eta)} \sum_{n=1}^{N} {}^n I_{psp}(\eta) d\eta & V_m(t) < \sigma \\ \delta(\tau - t) & V_m(t) \geq \sigma \end{cases}$$

wherein $E_0$ is a resting membrane potential, $k_m$ is a constant within the range defined by $0 < k_m < \infty$, $T_m$ is a constant within the range defined by $0 \leq T_m \leq \infty$, N is the total number of synapses, n=1, 2, ..., N and represents the ordinal number of a synapse connected to the nerve cell, e is the Napier's constant, t is time, $t_0$ is the time when the preceding pulse ended, τ is the time from t=0 to the current time, η is the time from t=$t_0$ to the current time, σ is the threshold value of an active potential of nerve cell membrane, and δ(t) is an impulse function.

14. The nerve equivalent circuit according to claim 12, wherein the input terminal of a synapse equivalent circuit is connected to the output terminal of a nerve cell body equivalent circuit, the synapse equivalent circuit for simulating electric characteristics of synapses, comprising an input terminal and an output terminal, an input signal $f_m(t)$ input to the input terminal and an output signal $I_{psp}(t)$ output from the output terminal having the relationship expressed by the formula shown below:

$$I_{psp}(t) = \sum_{m=1}^{M} {}^m k_P f_{in}(t) + \sum_{l=1}^{L} {}^l k_I \int_0^t e^{-\frac{1}{l}(t-l)} {}^n f_{in}(\tau) d\tau$$

wherein $k_P$ is a constant within a range defined by $-\infty < k_P < \infty$, $k_I$ is a constant within the range defined by $-\infty < k_I < \infty$, $T_I$ is a constant within the range defined by $0 < T_I \leq \infty$, L is the total number of the kinds of first transmitter substances that synapses have, I=1, 2, ..., L and represents the ordinal number of a first transmitter substance of synapses, M is the total number of the kinds of second transmitter substances that synapses have, m=1, 2, ..., M and represents the ordinal number of a second transmitter substance of synapses, e is the Napier's constant, t is time, and τ is the time from t=0 to the current time, the nerve cell body equivalent circuit for simulating electric characteristics of nerve cell bodies, the nerve cell body equivalent circuit comprising an input terminal and an output terminal, an input signal $I_{psp}(t)$ input to the input terminal and a membrane potential $V_m(t)$ output from the output terminal having the relationship expressed by the formula shown below:

$$V_m(t) = \begin{cases} -E_0 + (E_0 + V_m(t_0))e^{-\frac{1}{T_m}(t-t_0)} + \\ k_m \int_{t_0}^{t} e^{-\frac{1}{T_m}(t-\eta)} \sum_{n=1}^{N} {}^n I_{psp}(\eta) d\eta & V_m(t) < \sigma \\ \delta(\tau - t) & V_m(t) \geq \sigma \end{cases}$$

wherein $E_0$ is a resting membrane potential, $k_m$ is a constant within the range defined by $0 < k_m < \infty$, $T_m$ is a constant within the range defined by $0 \leq T_m \leq \infty$, N is the total number of synapses, n=1, 2, ..., N and represents the ordinal number of a synapse connected to the nerve cell, e is the Napier's constant, t is time, $t_0$ is the time when the preceding pulse ended, τ is the time from t=0 to the current time, η is the time from t=$t_0$ to the current time, σ is the threshold value of an active potential of nerve cell membrane, and δ(t) is an impulse function.

15. A program for causing a computer to function as a synapse equivalent circuit according to claim 1.

16. A program for causing a computer to function as a nerve cell body equivalent circuit according to claim 7.

17. A program for causing a computer to function as a nerve equivalent circuit according to claim 12.

* * * * *